(12) United States Patent
Hemphill

(10) Patent No.: US 9,316,044 B2
(45) Date of Patent: Apr. 19, 2016

(54) TAILGATE ROCK GUARD STRUCTURE FOR PICK-UP TRUCKS

(71) Applicant: FORD GLOBAL TECHNOLOGIES, LLC, Dearborn, MI (US)

(72) Inventor: Joshua Hemphill, Trenton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 13/858,084

(22) Filed: Apr. 7, 2013

(65) Prior Publication Data
US 2014/0298726 A1  Oct. 9, 2014

(51) Int. Cl.
*E06B 7/23* (2006.01)
*B62D 25/12* (2006.01)

(52) U.S. Cl.
CPC .............. *E06B 7/2314* (2013.01); *B62D 25/12* (2013.01)

(58) Field of Classification Search
USPC .................................. 296/57.1, 50, 58, 59, 60
IPC ................................ E06B 7/2314; B62D 25/12
See application file for complete search history.

(56) References Cited

U.S. PATENT DOCUMENTS

| | | | | |
|---|---|---|---|---|
| 5,664,822 A | * | 9/1997 | Rosenfield | 296/39.2 |
| 6,749,245 B1 | * | 6/2004 | Walker | 296/57.1 |
| 7,052,070 B1 | * | 5/2006 | Simonin | 296/57.1 |
| 8,459,716 B2 | * | 6/2013 | Kaplan | 296/57.1 |
| 2001/0004155 A1 | * | 6/2001 | Decker et al. | 296/57.1 |
| 2006/0006686 A1 | * | 1/2006 | Schmeichel | 296/50 |
| 2011/0080017 A1 | * | 4/2011 | Olson | 296/57.1 |

* cited by examiner

*Primary Examiner* — Gregory Strimbu
(74) *Attorney, Agent, or Firm* — Joseph E. Root

(57) ABSTRACT

A structure attached to a tailgate of a loading bed of a vehicle includes a first planar portion that positions substantially over a gap created between the tailgate and the loading bed, in a horizontally laid position of the tailgate, to prevent debris from falling into the gap. A second portion of the structure includes a first surface attached to a lower portion of the tailgate, and a second curved surface adapted to face the loading bed in the horizontal position of the tailgate.

4 Claims, 4 Drawing Sheets

TAILGATE ROCK GUARD STRUCTURE FOR PICK-UP TRUCKS

TECHNICAL FIELD

The present disclosure generally relates to pick-up trucks for loading and transporting items, and more specifically, to pick-up truck loading beds and tailgates.

BACKGROUND

Pick-up trucks of different sizes are used to transport goods and merchandise from one place to another. Typically, a loading bed in the pick-up truck, surrounded by side walls, is configured to hold items for transportation. The tailgate can be rotated from a vertical closed position to a horizontal open position, and back from the horizontal open position to the vertical closed position. Generally, when the tailgate is opened and brought to the horizontal open position, a gap is formed between the loading bed and the tailgate. This gap or cavity can catch items while loading and unloading goods. Many times, a pick-up truck is used to carry granular material, such as sand, gravel, and stones. The loose material often collects and accumulates in the gap when loading and unloading the granular material. The accumulated material in the gap can form an obstruction that makes it difficult to close the tailgate. Further, if the material is rocky, or is any other rigid material, closing the tailgate with the material in the gap might damage the tailgate and the loading bed. Therefore, the material in the gap needs to be removed every time an operator loads or unloads the goods from the loading bed.

Various conventional solutions have attempted to solve the problem mentioned above. One such solution covers the gap with a piece of flexible material, where one end of the piece is attached to the tailgate, and the other end is attached to the bed assembly. However, this can cause other problems. For example, if the material used for the gap cover is too flexible, the gap cover tends to sink down into the gap over time, thus only temporarily solving the problem it was intended to permanently alleviate. Further, if the gap cover material is too rigid, it can cause an obstruction to the movement of the tailgate from the vertical closed position to the horizontal open position. Another solution uses a flap covering the gap between the tailgate and the loading bed, the flap being connected to either the tailgate or the loading bed. But the flap forms a hump while the tailgate is in the open position, thus creating a problem in loading/unloading items. Some other conventional solutions use multiple flat panels positioned between the tailgate and the bed. The panels are attached to both the tailgate and the loading bed. However, in such cases, it takes a lot of time to detach the tailgate from the loading bed of the pick-up truck. Further, all of these flat panels need to be completely detached to remove the tailgate from the loading bed of the pick-up truck.

Considering the problems mentioned above, and other shortcomings in the art, a need exists for a structure that can be mounted between the tailgate and the loading bed of a pick-up truck, to prevent debris from accumulating in the gap, without causing hindrance to the movement of the tailgate between the closed and open positions.

SUMMARY

The present disclosure provides a structure shaped to fit into and completely cover a gap formed between the loading bed and a tailgate of a pick-up truck, in the horizontally laid open position of the tailgate. The structure prevents debris, such as soil, sand, gravel and the like, from lodging or passing through the gap and accumulating between the tailgate and the loading bed of the vehicle. The structure remains intact, and has sufficient stiffness to avoid creation of depressions due to pressure of the loaded items. The rigidity of the structure prevents it from sinking into the gap between the tailgate and the loading bed, during the process of loading or unloading the items.

In an aspect, the present disclosure provides a structure attached to a tailgate of a loading bed of a vehicle. The structure includes a first portion that positions substantially over a gap formed between the loading bed and the tailgate, in a horizontally laid open position of the tailgate. The first portion prevents loose material, such as debris from falling into the gap. The structure further has a second portion having a first surface and a second surface. The first surface of the second portion is attached to a lower portion of the tailgate, and has a surface profile matching the surface profile of the lower portion of the tailgate. The second surface faces the loading bed in the horizontal position of the tailgate.

According to another aspect of the disclosure, also disclosing a structure configured to be attached to a tailgate of a loading bed of a vehicle, the structure has a first planar portion configured to position substantially over a gap formed between the loading bed and the tailgate, in a horizontally laid open position of the tailgate. A second portion of the structure includes a first surface shaped to be attached to the tailgate, and a second curved surface adapted to face the loading bed.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

The present disclosure provides a structure, mountable at the rear portion of the loading bed of a vehicle, to prevent any debris from accumulating in the space between the loading bed and the tailgate of the vehicle, when the tailgate is opened and oriented in a horizontally laid open position. Specifically, the structure is a rock guard for a pick-up truck, and is disposed between the loading bed and the tailgate of the pick-up truck. The rock guard prevents debris, small pieces of rocky material and other loose material from falling and getting accumulated in the gap formed between the loading bed and the tailgate, in the horizontally laid open position of the tailgate, while loading and unloading goods from the pick-up truck. The rock guard is a sturdy piece of material, which remains stiff, and does not sink into the gap between the tailgate and the loading bed of the vehicle, due to the pressure of the items loaded into, or unloaded from the loading bed. Further, the rock guard doesn't cause any hindrance to the movement of the tailgate from the closed vertical position to the open horizontal position, or vice versa.

Figure 1:
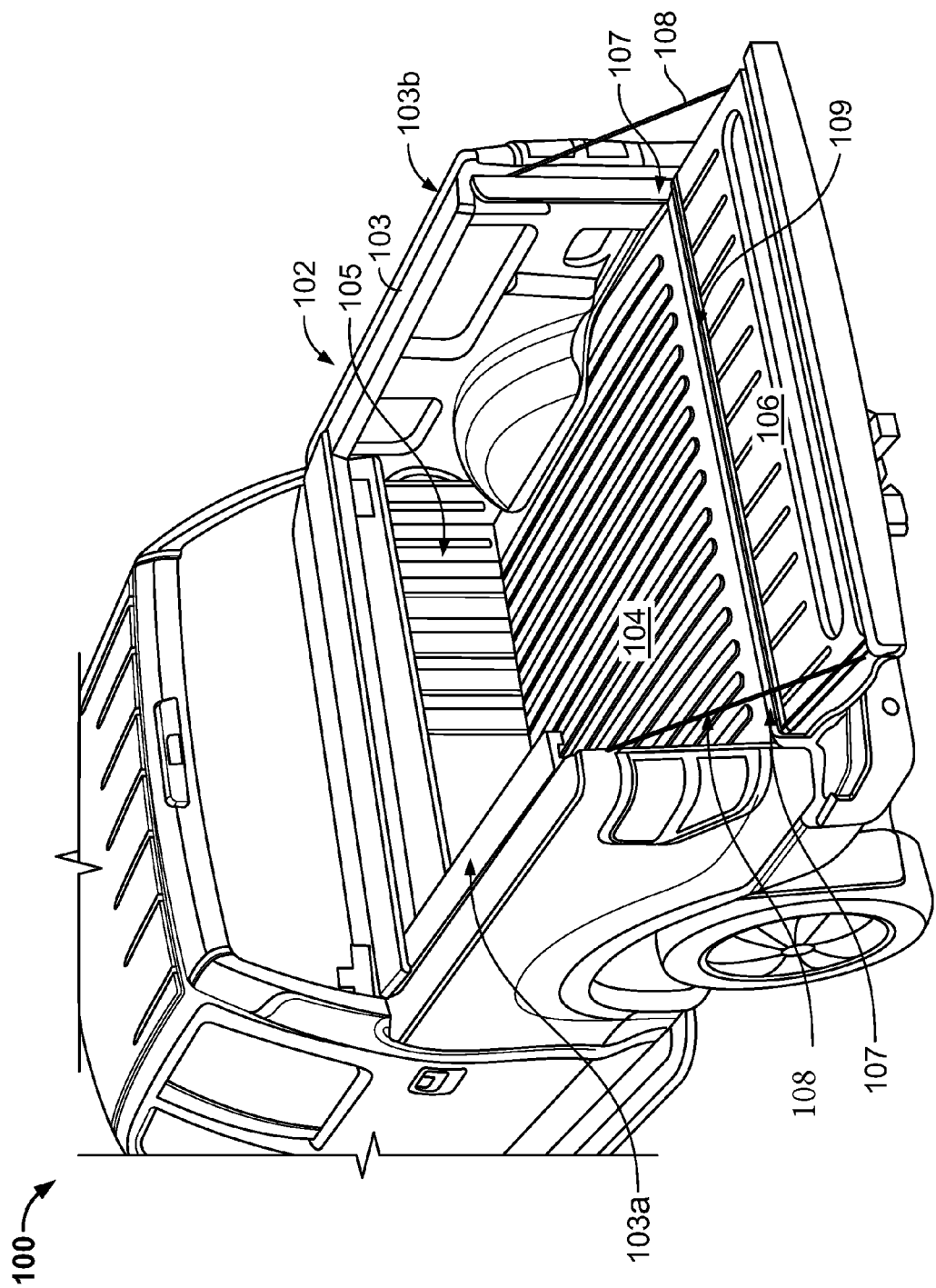
FIG. 1 is a perspective view of a rear portion of a pick-up truck, depicting a tailgate of the pick-up truck in a horizontally laid open position, where a gap is formed between the tailgate and a loading bed of the pick-up truck.

FIG. 1 is a rear perspective view of a pick-up truck 100. The goods for transportation are loaded over a loading bed 104, into a load carrying portion 102 of the pick-up truck. The load carrying portion 102 is surrounded by two opposing side walls, collectively designated 103 and separately 103 (*a*) and 103 (*b*), and a front wall 105. A tailgate 106 prevents the loaded items from falling off the loading bed 104, when the vehicle is driven. A rectangular box is formed by the side walls 103 (*a*) and 103 (*b*), the front wall 105 and the tailgate 106, when the tailgate is in the closed vertical position. The bottom portion of the tailgate 106 is pivotally connected to the rear edge of the loading bed 104, to facilitate rotation of the tailgate 106 between the horizontally laid open position when the tailgate 106 is opened, and the upright position, when the tailgate 106 is closed. Specifically, the tailgate 106 pivots about two pivot points 107, and is configured to rotate from the closed vertical position to the open horizontal position, and back from open horizontal position to the closed vertical position, about these pivot points.

The rotation of the tailgate 106 with respect to the loading bed 104 is constrained by two limit wires 108. The limit wires 108 are configured to constrain rotation of the tailgate 106 between two specific extreme angular positions. A cavity or a gap 109 is formed between the tailgate 106 and the rear end of the loading bed 104, when the tailgate 106 is in the horizontally laid open position, as shown. During the process of loading or unloading of goods, loose material, such as rocks, debris, and other granular material, can accumulate in the gap 109. The material that accumulates in the gap 109 prevents the tailgate 106 from closing back into its vertical position. Further, forcefully shutting the tailgate 106 in such situations may cause damage to the bottom portions of the tailgate 106. Therefore, it is necessary to prevent debris from accumulating within the gap 109 formed between the tailgate 106 and the loading bed 104 by covering the gap 109 with a structural member that may substantially occupy the gap and prevent the debris from falling therein.

Figure 2:
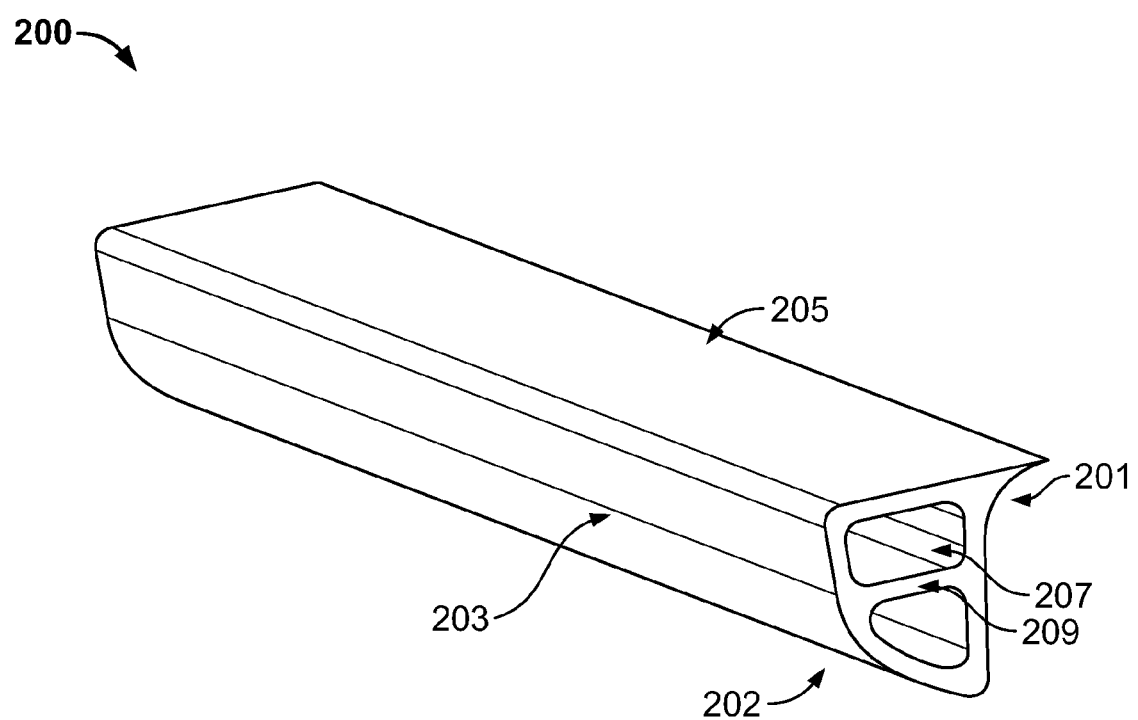
FIG. 2 is a perspective view of a structure adapted to be positioned and mounted between the tailgate and the loading bed of a pick-up truck, according to an embodiment of the present disclosure.

FIG. 2 is a perspective view of a structure configured to be positioned and mounted along the gap 109 (shown in FIG. 1) formed between the tailgate 106 and the loading bed 104 of the pick-up truck 100. The structure is a rock guard 200 configured to substantially cover the gap 109. The rock guard 200 includes a first portion 205, and an arcuate second portion 202. The first portion 205 has a substantially planar surface profile, and is configured to prevent debris/loose material from entering into, and accumulating within the gap between the tailgate and the loading bed. The first portion 205 is configured to orient horizontally, substantially coplanar to the tailgate 106 and the loading bed 104 (shown in FIG. 1), and is configured to substantially cover the upper portion of the gap 109. Oriented in that manner, the first portion 205 prevents debris from falling into the gap 109, when goods are loaded over or unloaded from the loading bed 104. The material composition of the first portion 205 provides it sufficient stiffness to prevent the formation of any depressions on its surface, due to the pressure of items loaded/unloaded. Preferably, the entire rock guard 200 is made of natural or synthetic rubber, though in some embodiments, other sufficiently stiff materials such as high strength plastic can also be used.

The arcuate second portion 202 includes a leg having first surface 201 and an opposing leg having a second surface 203. The first surface 201 is dimensioned and shaped to be directly attached to the bottom portion of the tailgate. To affect that, the first surface 201 is designed to have a surface profile substantially matching the profile of the bottom portion of the tailgate. The second surface 203 of the arcuate second portion 202 is outwardly convex, and that surface protrudes outwards, towards the loading bed 104, when the tailgate 106 is in the horizontally laid open position. When the tailgate is closed and oriented in the upright position, the rock guard 200 turns upside down, and the second surface 203 orients in a downward direction. That orientation of the rock guard 200 can be more easily envisioned through a subsequent figure of the disclosure that illustrates the rock guard 200 in a mounted position. The rock guard has a hollow interior portion 207, which is configured to receive and accommodate a slab 209. Positioned between the first surface 201 and the second surface 203 of the rock guard 200, the slab 209 extends through the entire longitudinal length of the rock guard 200. That slab 209 provides rigidity to the rock guard 200, and prevents the rock guard 200 from deforming, when the tailgate 106 is opened or closed. Any suitable material, such as high strength plastic can be used for forming the slab 209.

The rock guard 200 has a unitary structure, with the different portions, i.e., the first portion 205, the arcuate second portion 202 and the slab 209 being the integral components of that structure. However, the different portions may also be manufactured separately, and integrated to form the rock-guard 200. Any suitable manufacturing process may be used to manufacture the rock guard 200, including molding.

Figure 3:
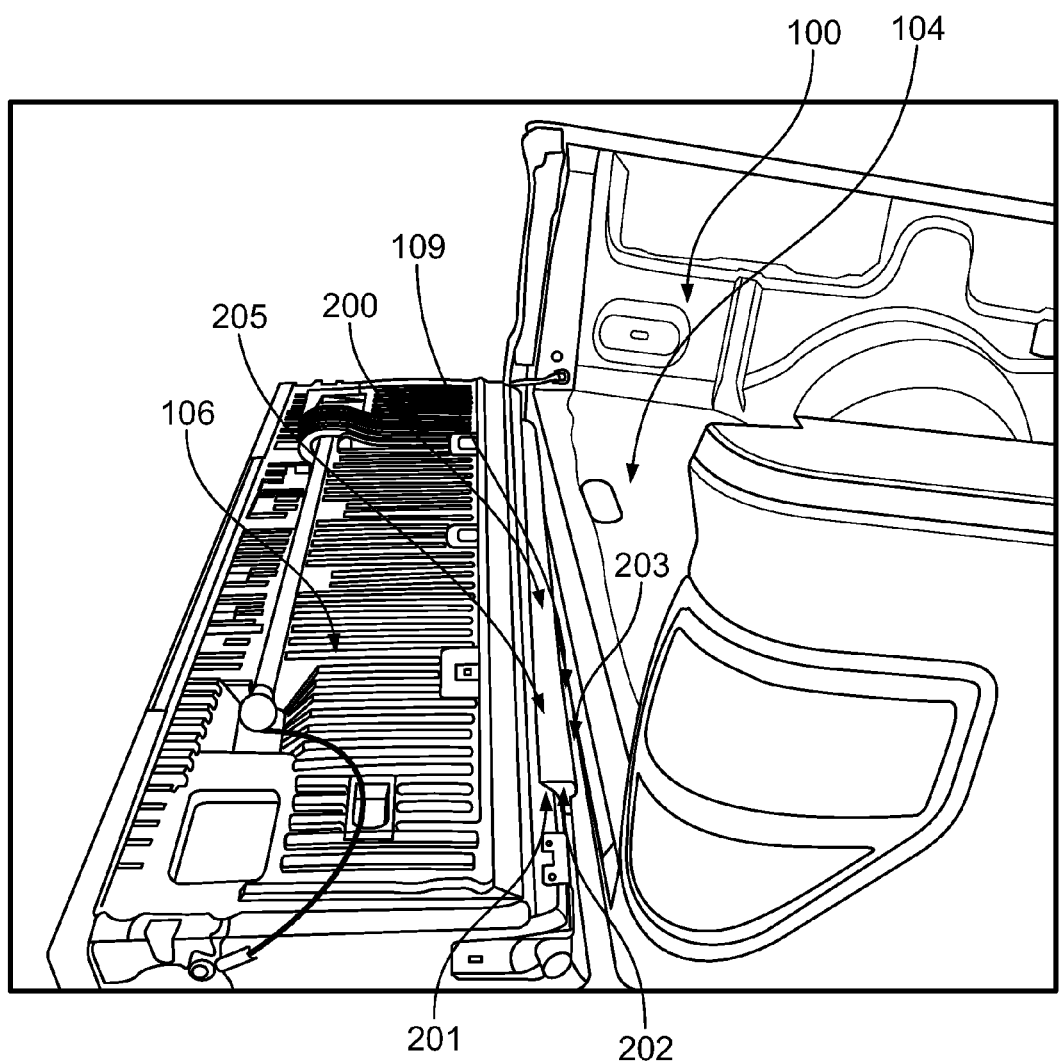
FIG. 3 is a side view of a rear portion of a pick-up truck, depicting the structure of FIG. 2 positioned between the loading bed and the tailgate of the pick-up truck, the tailgate being shown in the horizontally laid open position.

FIG. 3 is a view of a rear portion of a vehicle, depicting the rock-guard 200 positioned and mounted along the gap 109 formed between the loading bed 104 and the tailgate 106. The tailgate 106 is shown in the horizontally laid open position. As is apparent, the first portion 205 (i.e., the top portion) of the rock guard 200 is oriented horizontally and positions coplanar to the loading bed 104 and the tailgate 106. The first portion 205 has a substantially planar surface. Further, since the rock guard 200 is positioned coextensively with the tailgate 106, the first portion 205 nearly covers the entire top portion of the gap 109, when the tailgate 106 is in the horizontally laid open position. Oriented in the depicted configuration, the first portion 205 prevents any loose material from falling into the gap 109, during the process of loading or unloading of goods. The second portion 202 is positioned underneath the first portion 205 of the rockguard, and fills the gap 109.

The first surface 201 of the arcuate second portion 202 is attached directly to the bottom portion of the tailgate 106. To facilitate proper alignment and fitting, the first surface 201 and the bottom portion of the tailgate 106 have substantially similar curvatures. Suitable means for attaching the first surface 201 to the tailgate 106 may be through the use of sheet metal screws or plastic push pins. In some embodiments, other means of attachment, such as adhesively bonding the rock guard 200 to the tailgate 106 may also be employed.

As shown, the second surface 203 of the second arcuate portion 202 faces the loading bed 104 of the pick-up truck 100, in the horizontally laid open position of the tailgate 106. Having a convex profile, protruding outwards and facing the rear edge of the loading bed 104, the second surface 203 does not cause any obstructions during the movement of the tailgate 106 between the horizontally laid open position and the vertical closed position.

Figure 4:
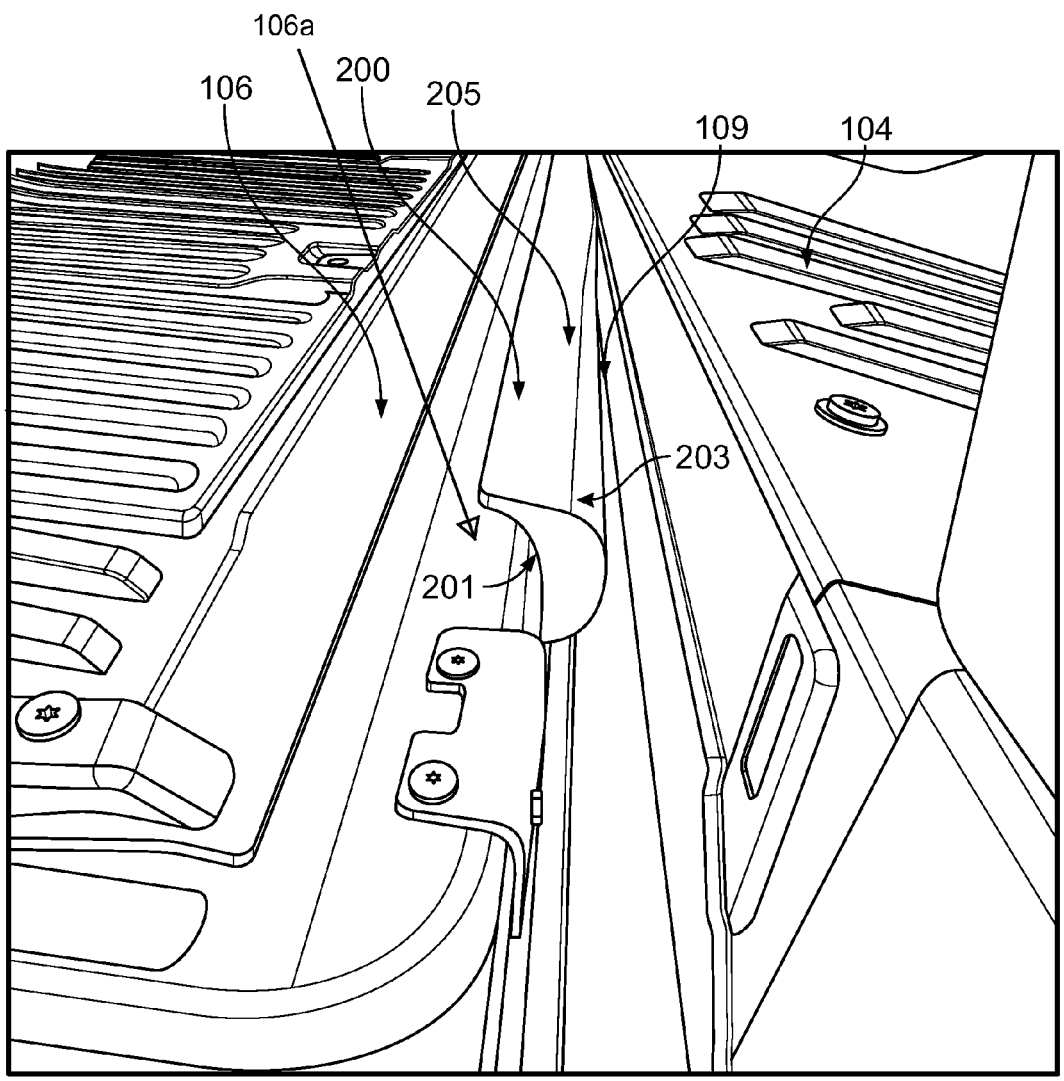
FIG. 4 is an enlarged view of a portion between the tailgate and the loading bed of a pick-up truck, depicting the structure of the FIG. 2 attached to a bottom portion of the tailgate, and mounted in the gap formed between the loading bed and the tailgate.

FIG. 4 is an enlarged view of a rear portion of the pick-up truck 100, depicting the rock guard 200 attached to a bottom portion 106 (a) of the tailgate 106. As can be seen more clearly through the figure, the rock guard 200 is positioned between the tailgate 106 and the loading bed 104, and substantially occupies and covers the gap 109 formed between the loading bed 104 and the tailgate 106. Further, the rock guard 200 aligns and positions substantially longitudinally, along the width of the tailgate 106, coplanar with the tailgate 106 and the loading bed 104. The first portion 205 of the rock guard 200 faces upwards in the shown position, and prevents debris from falling into the gap 109, during the process of unloading/loading items. The first surface 201 of the arcuate second portion 202 of the rock guard 200 attaches directly to the bottom portion 106a of the tailgate 106. Effectively, the first surface 201, is designed and dimensioned to have a surface profile and curvature substantially matching the surface profile of the bottom portion 106a of the tailgate 106.

It can be easily envisioned that when the tailgate 106 is closed and vertically upright, the second portion 203 faces convex downwards, and the rock guard 200 lies substantially underneath the bottom portion 106(a) of the tailgate 106.

The rock guard of the present disclosure can be used for any pick-up truck, irrespective of its size and capacity, including the compact, medium-size and full-size pick-up trucks. The size and shape of the rock guard, configured to be positioned and mounted between the tailgate and the loading bed, may vary in different embodiments, based on size of the pick-up truck.

Although the current invention has been described comprehensively, in considerable details to cover the possible aspects and embodiments, those skilled in the art would recognize that other versions of the invention are also possible.

What is claimed is:

1. A tailgate rotatably attached to a truck loading bed and adapted to rotate between open and closed orientations, wherein rotation of the tailgate to the fully open orientation produces a gap between the loading bed and the tailgate, the tailgate comprising
    a lower tailgate portion generally adjacent to the loading bed, an upper tailgate portion generally opposite the lower portion, and a bottom tailgate portion pivotally connected to a rear edge of the loading bed,
    a rock guard, including
        a first planar portion positioned and dimensioned to cover the gap between the tailgate and the truck loading bed, for preventing objects from being disposed in the gap; and
        a second portion including:
            a first leg shaped generally to conform to the bottom portion of the tailgate and engaged with the bottom portion of the tailgate, the first leg being formed integral with an end of the first planar portion and extending generally perpendicular to the first planar portion; and
            a second leg formed integral with and extending in a convex arc between the first leg and a second end of the first planar portion;
        wherein the rock guard is generally triangular in cross-section, a side of the first planar portion being generally straight, and a side of the first leg and a side of the second leg being arcuate.

2. The tailgate of claim 1, wherein the rock guard includes a hollow interior portion configured to receive and accommodate a slab therein, the slab extending along a longitudinal length of the rock guard and providing rigidity to the rock guard.

3. The tailgate of claim 1, wherein the rock guard is one of adhesively bonded to or mechanically fastened to the bottom portion of tailgate.

4. The tailgate of claim 1, wherein the rock guard is formed of one of a group consisting of synthetic rubber, natural rubber or a plastic material.

* * * * *